(No Model.)
R. M. SHAFFER.
DOUGH KNEADER AND MIXER.
No. 519,740. Patented May 15, 1894.
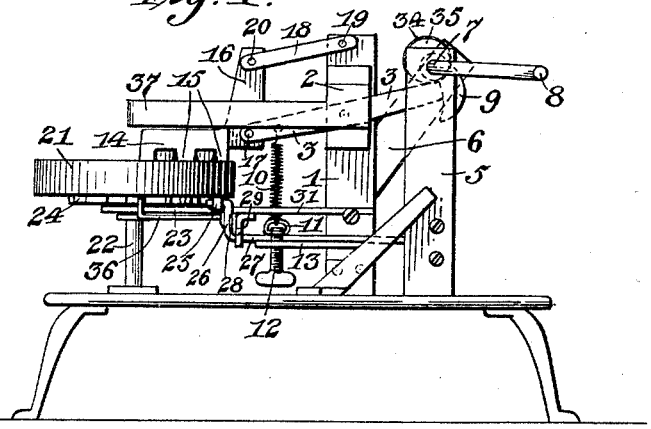
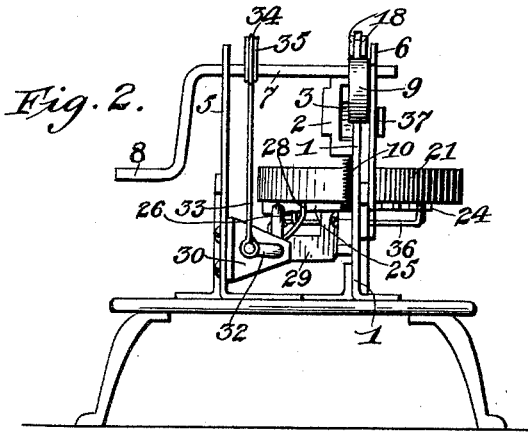
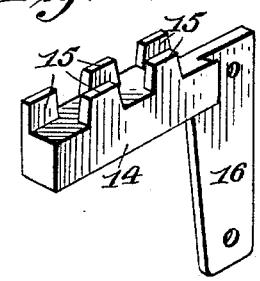
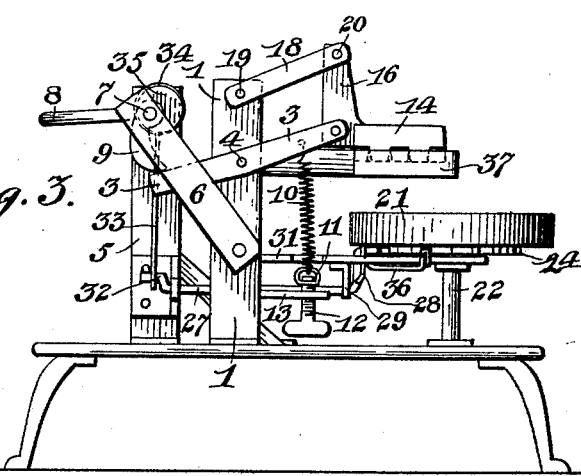
Witnesses
Severance
Peter Hoor
Inventor
Richard M. Shaffer
by Vernon H. Dorsey
his Attorney
THE NATIONAL LITHOGRAPHING COMPANY,
WASHINGTON, D. C.

UNITED STATES PATENT OFFICE.

RICHARD M. SHAFFER, OF BALTIMORE, MARYLAND.

DOUGH KNEADER AND MIXER.

SPECIFICATION forming part of Letters Patent No. 519,740, dated May 15, 1894.

Application filed May 25, 1893. Serial No. 475,462. (No model.)

*To all whom it may concern:*

Be it known that I, RICHARD M. SHAFFER, a citizen of the United States, residing at Baltimore, in the State of Maryland, have invented certain new and useful Improvements in Dough Kneaders and Mixers; and I do hereby declare the following to be a full, clear, and exact description of the invention, such as will enable others skilled in the art to which it appertains to make and use the same.

My invention relates to that class of devices which are known in the art as "dough-kneaders and mixers," and it more especially relates to devices for beating the dough, as is necessary in the manufacturing the so-called Maryland beaten biscuit; and for this purpose it consists in a hammer adapted to strike a direct blow upon the dough and driven by any suitable means, and in a table upon which the dough is placed, and which is moved forwardly under the hammer by a suitable tipping mechanism, whereby the several parts of the dough will be successively brought under the hammer, and it also consists in the construction, arrangement and combination of the several parts of which it is composed, as will be hereinafter more fully described and claimed.

Referring to the accompanying drawings in which corresponding parts are designated by similar marks of reference: Figure 1 is a side view of a device constructed in accordance with this invention. Fig. 2 is an end elevation thereof. Fig. 3 is a side elevation taken from the opposite side of Fig. 2, it being shown partly in section, and the hammer being shown as raised. Fig. 4 is a detail view of the striking surface of the hammer.

The hammer which I prefer to use consists of a pivoted lever having a hammer-head fastened on one end thereof, the hammer head being over the beating table, while the opposite end of the lever projects to a suitable distance from the table and is adapted to be actuated by a rotating cam or its equivalent, whereby the hammer-head will be caused to reciprocate to and away from the beating table. I prefer to use this construction for the reason that, although a vertical trip hammer may be used to beat the dough, such a hammer having its working parts directly above the dough, there is danger of oil dripping therefrom upon the latter, which of course is a serious drawback, and because the preferred construction leaves the beating table more easy of access.

In constructing such a hammer, I erect a main post 1, having a bracket 2 formed thereon, and to such post and adjacent to the bracket thereon I pivot the lever 3 of the hammer, while the bolt 4 serves as a pivotal point. In the rear of the main post 1 I erect a standard 5, through the top of which standard, and through the upper end of an inclined brace 6 secured to the main post, the driving shaft 7 passes, it being suitably journaled therein. This shaft which is adapted to be driven in any suitable manner (it being shown in the drawings as driven by a crank handle 8) passes above the rear end of the hammer lever 3, and has above the said lever a cam 9 secured thereon which in the rotation of the said shaft is adapted to press the rear end of the lever downwardly and to release it, the said rear end being thrown up and the forward end thereof being drawn down, either by a preponderance of weight in the forward end of the lever, or by a spring 10 secured to the forward end thereof. In case such a spring is used, I prefer a coil spring as shown in the drawings the lower end of the said spring being secured to a swivel 11 mounted on the upper end of the screw 12, the said screw passing through a horizontal bracket 13 secured to the main post and affording a means whereby the tension of the spring, and thus the force of the blow of the hammer may be regulated.

The hammer proper consists of the head 14, elongated in shape, and having teeth 15 alternately disposed upon the opposite sides thereof (see Fig. 4), and of a vertical arm 16. The lower part of the said arm is pivoted within the forward end of the hammer lever 3, by means of the pivot 17, while the upper end of the said arm is connected with the upper end of the main post 1 by means of the lever 18 and pivots 19 and 20, the distance between the pivots 19 and 20 being the same as the distance between the pivots 4 and 17 of the hammer lever. By this construction it will be observed that the hammer head remains horizontal, irrespective of the inclination at which the lever 3 may be, and that the hammer head will strike the table, hereinafter described, a square blow, instead of one at an inclination thereto, which would have a tendency to merely displace the dough without beating it.

The table consists of a suitable disk 21 mounted upon the upper end of an upright shaft 22, suitably journaled in a support 23, the center of the table being by preference slightly in the rear of the hammer head, while the top of the table is horizontal and at a suitable distance below the hammer head when the latter is raised, and upon the table the dough to be worked is placed. Upon the under surface of the table and concentric with the upright shaft 22 is secured the ratchet wheel 24, with which a dog 25 carried by a crank 26 upon the horizontal shaft 27 is adapted to engage, the dog being pressed against the ratchet wheel by a spring 28 formed by a wire passing through the crank and bearing against the dog. The shaft 27 is carried in brackets 29 and 30, the latter being secured to the standard 5, and the former being secured to the tie-plate 31 projecting from the main post 1 and encircling the upright shaft 22, thereby strengthening it against upsetting and uniting the several parts of the device into one homogeneous structure. The shaft 27 has upon its opposite end a crank 32, substantially at right angles to the crank 26, upon the other end thereof. The crank 32 is connected with the lower end of a rod 33, the upper end of which is formed into a collar 34 and encircles an eccentric 35 secured upon the main driving shaft 7, whereby upon a rotation of the said driving shaft the lower end of the connecting rod 33 will be reciprocated in a vertical direction, imparting a corresponding reciprocation to the crank 32 and a horizontal reciprocation to the crank 26, upon the opposite end of the horizontal shaft 27 and to the dog 25 carried by the last named crank, which in turn will engage the ratchet wheel 24 upon the table and feed the latter forwardly, causing it to rotate, whereby the several portions of the dough upon the table will be successively brought under the hammer, and I so adjust the position of the eccentric upon the driving shaft that the feed of the table will take place when the hammer is raised. A spring click 36 secured upon the tie rod 31 engages the ratchet wheel 24, and prevents the backward rotation thereof and of the table. A guard consisting of a horizontal arm 37 secured to the bracket 2 upon the main post has its forward end bent backwardly over the table and around the hammer head, and serves to prevent the engagement of foreign material therewith and to scrape the dough therefrom. It is obvious that the details of construction may be changed without departing from the scope of my invention, and What I therefore claim is:

1. The combination with a suitable support, of two levers pivoted thereto, a hammer head pivoted to the corresponding ends of the said levers, and a driven cam engaging the opposite end of one of the said levers, substantially as described.

2. The combination with a suitable support, of two levers pivoted thereto and projecting to one side thereof to approximately equal distance, one of the said levers projecting to the opposite side of the said support, a driven cam bearing on the said projecting end, and a hammer, having an arm pivoted to the free ends of the said levers, substantially as described.

3. The combination with a suitable support, of two levers pivoted thereto and projecting to one side thereof to approximately equal distance, one of the said levers projecting to the opposite sides of the said support, a shaft having a cam thereon tipping the projecting end of the said lever, a hammer having an arm pivoted to the free ends of the said levers, a rotary table below the said hammer, and a dog driven by the said shaft and engaging the said table to feed it forward step by step, substantially as described.

In testimony whereof I affix my signature in presence of two witnesses.

RICHARD M. SHAFFER.

Witnesses:
   THOS. M. DOBBIN,
   WILLIAM H. BERRY.